United States Patent [19]
Schabert et al.

[11] 3,952,885
[45] Apr. 27, 1976

[54] NUCLEAR REACTOR INSTALLATION

[75] Inventors: Hans-Peter Schabert, Erlangen; Robert Weber, Uttenreuth; Artur Bauer, Erlangen, all of Germany

[73] Assignee: Siemens Aktiengesellschaft, Munich, Germany

[22] Filed: July 25, 1974

[21] Appl. No.: 491,663

[30] Foreign Application Priority Data
July 27, 1973 Germany............... 2338228

[52] U.S. Cl............................. 214/18 N; 176/30
[51] Int. Cl.²........................................ G21C 19/20
[58] Field of Search............... 214/18 N, 103; 176/30–32

[56] References Cited
UNITED STATES PATENTS
3,637,096  1/1972  Crate ........................ 214/18 N
FOREIGN PATENTS OR APPLICATIONS
857,558  12/1960  United Kingdom............... 214/18 N Primary Examiner—Robert G. Sheridan
Attorney, Agent, or Firm—Kenyon & Kenyon Reilly Carr & Chapin

[57] ABSTRACT

A nuclear reactor installation has a containment wall through which a fuel element transfer tube extends and through which fuel elements are passed endwise. The elements are carried by an elongated carrier provided with guide means which at the opposite ends of the tube turn the carrier, and therefore the elements, to vertical positions. Force must be applied to the carrier to cause it to travel back and forth through the tube and to be erected by the guide means. For this purpose, the tube is positioned at an angle from horizontal, the angularity being sufficient so that the force of gravity causes the travel and erection of the carrier in one direction, travel in the opposite directing being effected by a cable which, when tensioned, forces the travel and erection of the carrier and fuel element, in the opposite direction.

2 Claims, 6 Drawing Figures

NUCLEAR REACTOR INSTALLATION

BACKGROUND OF THE INVENTION

This invention relates to a nuclear reactor installation having a containment wall which on one side forms a reactor room in which a reactor pressure vessel is positioned, and on its other side forming a fuel element handling pit. A fuel element transfer tube extends through the wall and is proportioned for the endwise transfer of fuel elements in either direction between the room and pit. After endwise travel transversely through the wall via the tube, the elements must be erected or turned to vertical positions for handling by the reactor refueling machine and the fuel element handling equipment in the pit.

For effecting the transfer of fuel elements through the tube, the U.S. Crate Pat. No. 3,637,096, dated Jan. 25, 1972, discloses the transfer tube in a conventional horizontal position. An elongated carriage on which a fuel element carrier is pivoted runs on horizontal tracks extending through the tube and to carrier erecting locations in the room and pit, at which locations curved guideways with which the pivoted carrier is engaged, turn upwardly and downwardly, respectively, so that with horizontal travel of the carriage the carrier, pivoting with respect to the carriage, is erected. To apply the necessary travel force to the carriage, the latter is provided with a submersible electric motor powering wheels on which the carrier runs on the horizontal tracks, the motor being powered via an electric cable handled via a power supply and retrieval reel mounted above the pit. In the event of an electric power failure, this reel may be used, being presumably powered, to withdraw the carriage and carrier to the pit.

Such a power failure is a possibility because a submersible electric motor is required and this motor must connect with the carriage wheels by a drive arrangement, it being understood that both the reactor room and pit and transfer tube are water-flooded during fuel element transfer operations. The electric cable itself is for the same reason apt to fail, and if protected by armor, its flexibility is reduced.

SUMMARY OF THE INVENTION

The object of the present invention is to provide a reactor installation having a fuel element transfer arrangement of the above-patented type, but improved for the purpose of eliminating that arrangement's disadvantages.

According to this invention, the fuel element transfer tube is extended through the containment wall at an angle from horizontal, the guideway having a corresponding angularity. Preferably the angularity is such that the tube declines from the pit to the reactor room, and it is such that the weight of the carriage and carrier and the fuel element or elements carried by the carrier, are sufficient to supply the force required for travel from the pit to the reactor room. For the opposite travel, a flexible mechanical cable, such as a wire rope, connects with the carriage and with a powered winch positioned on the outside of the containment wall above the water level of the flood water in the pit. The mechanism which powers this winch, such as an electric or hydraulic motor, for example, is thus located free from the flood water and in the open on the outside of the containment wall. Therefore, the winch power source, and the necessary drive between the power source and the winch, should normally be trouble free.

The guideway may be contoured to erect the fuel element and its carrier at both ends of the transfer tube; the guideway erection caused by travel of the carriage may be located only in the fuel handling pit, a conventional erecting mechanism being located in the reactor room.

The fuel element carrier may be designed to handle two fuel elements in side-by-side relationship and requiring endwise insertion of the fuel elements in the carrier as suggested by the patent and in the case of fuel elements for a pressurized-water reactor core with the reactor having a power of, for example, 1,200 MWe, a transfer tube angularity or declination of as little as 10° from horizontal should ordinarily be adequate for the gravitational operation of the arrangement, assuming the carriage rollers are properly journaled so that the rolling friction is not excessive. Angularities of up to 45° and even more can be used if considered to be of advantage for structural reasons.

BRIEF DESCRIPTION OF THE DRAWINGS

The accompanying drawings schematically illustrate both the principles of the operation of this invention and the presently preferred mode for carrying out the invention, the various figures being as follows.

DETAILED DESCRIPTION OF THE INVENTION

Figure 1:
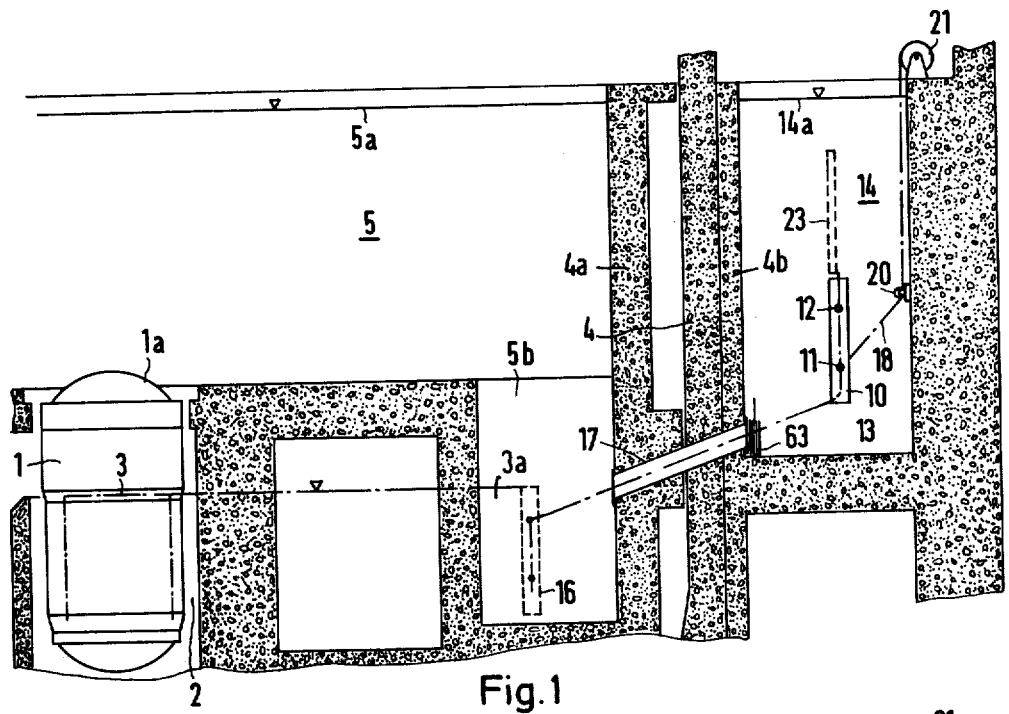
FIG. 1 in vertical section schematically shows the portions of a pressurized-water reactor installation required to illustrate the operating principle of this invention.

Having reference first to FIG. 1, the pressurized-water reactor pressure vessel is shown at 1 with its removable head 1a and with the vessel in the usual pit 2 formed by the concrete of the reactor building. The wall 4 is the pressure-tight containment wall which surrounds the entire area which is non-accessible during normal reactor operation. The wall 4a on the inside of the wall 4 defines the reactor room 5 and the wall 4b on the outside of the wall 4 is part of the fuel handling pit described hereinafter. The three walls are, in effect, one wall, insofar as the present invention is concerned.

For refueling, the room 5 is water-flooded up to the level indicated at 5a before the reactor vessel head 1a is removed. The reactor room has a pit 5b which is offset from the pressure vessel and where the fuel elements are erected or turned and this pit is, of course, also water-flooded at that time. In addition, the fuel element handling pit 14 is also water-flooded up to the level 14a which is the same as the water level 5a. This pit 14 is formed in part by the wall 4b and in part by the overall concrete construction of the reactor building.

In accordance with this invention, the fuel element transfer tube 17 which extends through the walls 4, 4a and 4b, declines from the bottom of the pit 14 to the pit 5b on the inside of the containment wall 4. During normal reactor operation, when the reactor room 5 is dry, the pit 14 may be kept flooded because a gate valve 63 closes the higher end of the angled tube 17. This gate valve 63 is opened during the fuel element transferring operation.

The lower end of the declining tube 17 opens into the pit 5b. This may be a fuel storage pit and, therefore of relatively large dimensions, but in any event, its transverse dimensions must be such as to permit turning of the fuel elements. The fuel element carriage is shown at 10 as being elongated and having longitudinally interspaced guide rollers 11 and 12 for cooperation with the previously referred to kind of guideway, not shown in FIG. 1. In the pit 13, the carriage 10 is shown in its vertical position from which it turns to a declining position, travels through the tube 17 until in the pit 5b the carriage returns to its vertical position as shown at 16 in broken lines. The angularity of the tube 17 is illustrated as being 20° from horizontal. The wire rope 18 which returns the carriage after its gravitational downhill travel is shown at 18 by a broken line, attached to the carriage 10 and via a guide sheave 20 running up to above the water level 14a where it is coiled on an appropriately powered winch 21, the latter and all of its equipment being completely free from water permitting its trouble free operation and easy maintenance if necessary, it being on the outside of the containment wall 4 and in the accessible area of the reactor building.

In operation, the fuel element or elements 23 are loaded into the carrier of the carriage 10 in endwise fashion, as in the patent. However, for the transfer to the pit 5b on the inside of the containment wall, the winch 21 need only be driven in its unwinding direction, the weight of the carriage and carrier and fuel element or elements, through gravity, providing the force required for the travel through the tube 17 into the pit 5b where the erecting action occurs. The equipment in the pit 5b is preferably designed so that when inverted as shown at 16, the tops of the fuel elements have the same height level as the top of the core 3 in the vessel 1, as indicated by the broken line 3a. This provides the same gripper height position of the refueling machine (not shown) both at the core top 3 and at the element top in the pit 5b. The gripper of the refueling machine is customarily position controlled by limit switches as to the top level of the fuel elements comprising the reactor core, indicated at 3, so the refueling machine need not be readjusted when used over the pit 5b.

Figure 2:
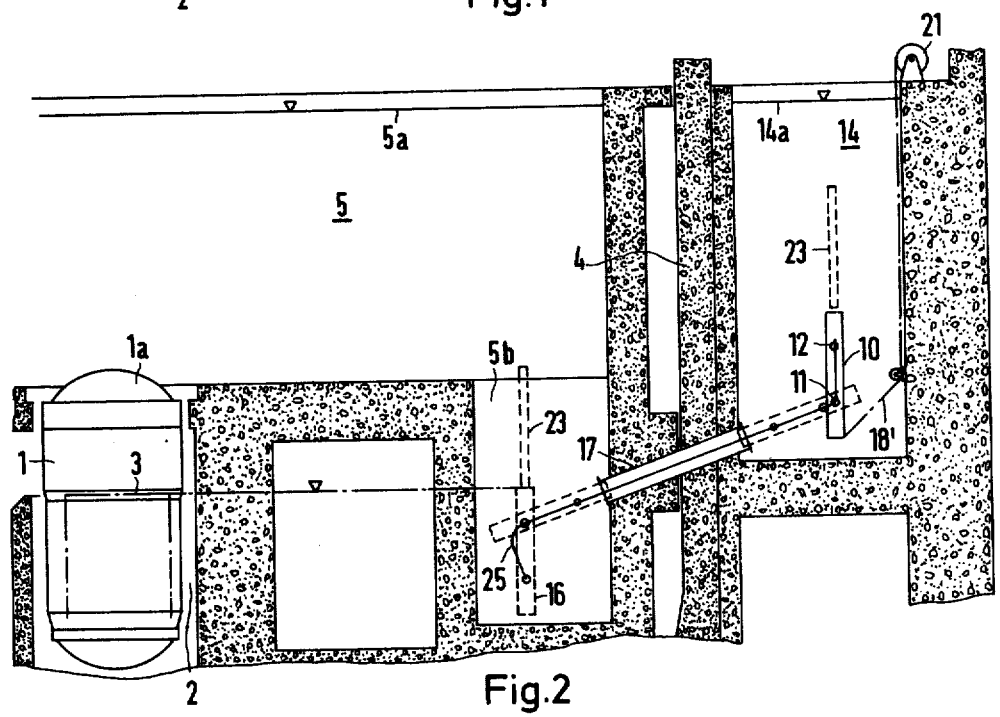
FIG. 2 is like FIG. 1 but shows a modification.

Referring now to FIG. 2, in this case the wire rope 18' is connected to the bottom of the carrier of the carriage 10 so that when the carriage reaches its uppermost position in the pit 14, the continued pull on the wire rope 18' automatically pivots the carrier to its vertical position, eliminating the need for a curved guideway at its upper position. When at the lower position, the guideway curve portion 25 erects the carrier to its erected position indicated at 16.

Figure 3:
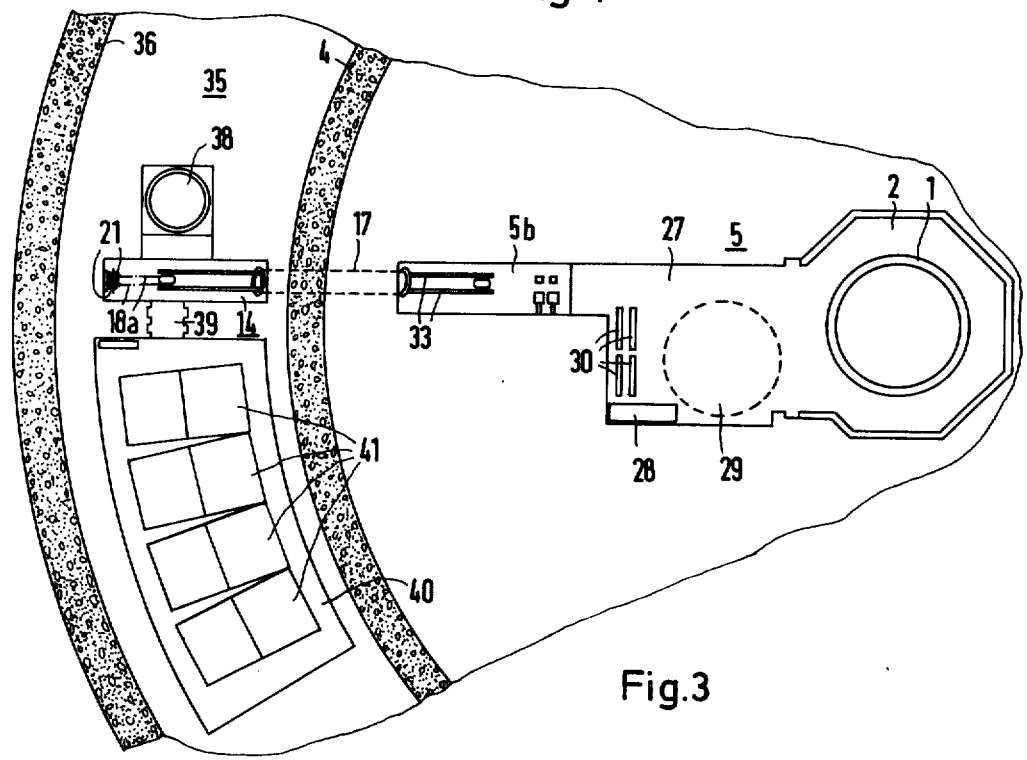
FIG. 3 in horizontal cross section illustrates the preferred mode.
Figure 5:
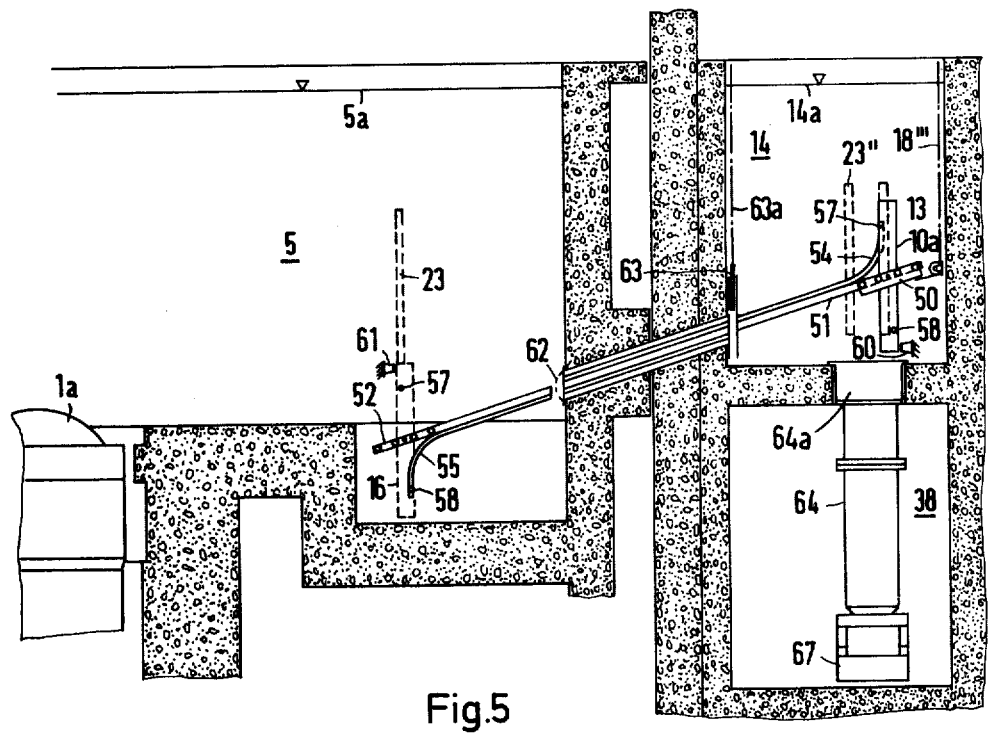
FIG. 5 shows the preferred mode in vertical section.

Referring to FIGS. 3 and 5, reactor room 5 includes a lay-down area 27 connecting with the pit 5b and which is substantially wider than the latter. The rails for the transfer carriage are shown at 33 leading from the pit 50 via the transfer tube 17 to the pit 14, and as shown at 18a two wire ropes are used to force the transfer carriage uphill for erection in the pit 14. The pit 14 is located here in the annular space 35 conventionally formed between the containment wall 4 and the outer reactor building concrete wall 36.

The basin 27 provides room for a rack 28 in which removed control element drive rods may be stored, and as indicated by broken-line circle at 29, there is room for the reactor upper guide and support structure which is normally removed from the vessel 1 during refueling. 30 indicates racks in the basin 27 for receiving the core instrumentation of the reactor if it is removed during refueling. All of this area defined by the pit 5b and basin 27 is water-flooded prior to removal of the pressure vessel head.

FIG. 3 also shows that the outer pit 14 connects with a fuel element transfer station 38, described more in detail hereinafter, and that the fuel element handling pit 14 is connected via a lock 39 with a fuel element storage pit 40 containing fuel element racks 41.

Figure 4:
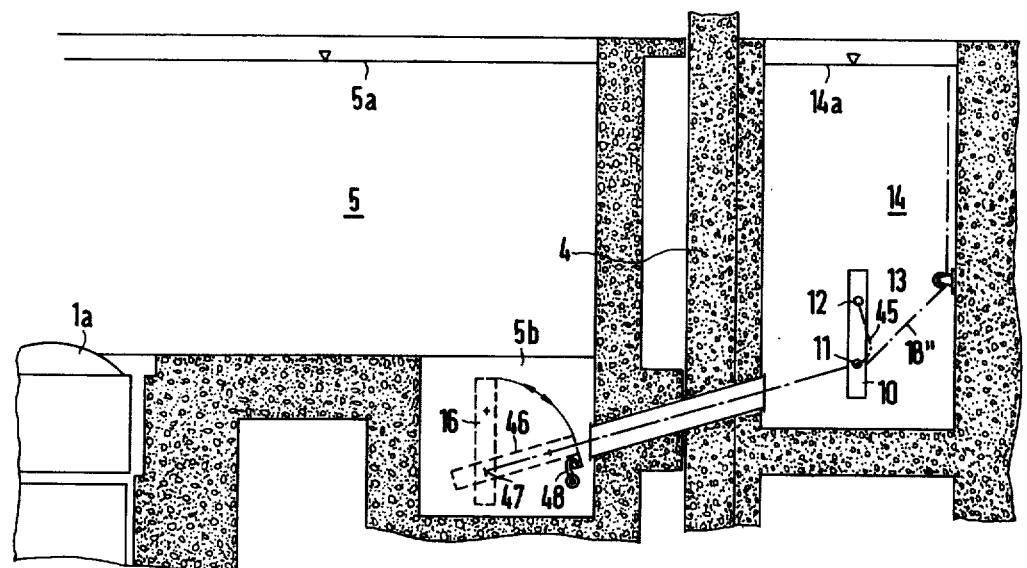
FIG. 4 is again like FIG. 1, but shows a further modification.

In the modification shown by FIG. 4, the carriage erecting guideway is shown at 45 with the curve which erects the carriage 10, at 13, when pulled upwardly by the wire rope 18''. However, in the inner pit 5b a tilting device 46 is provided which tilts about the pivot point 47. The curved guideway carrier erecting system is not used. Instead, the pivot point 47 is selected so that when the mechanism 46 receives the carriage 10, the weight of the latter and its load automatically provides the erection to the position indicated at 16. When the wire rope 18'' is pulled, the mechanism 46 returns to an inclined position aligned with the transfer tube. Although not shown, it is also possible to have a spring which normally biases the mechanism 46 to the vertical position from which it is pulled by the pull of the cable 18'' removing the carriage. When pulled to this inclined position, a latch 48 latches the mechanism 46 against the force of the spring, this latch being unlatched by the gravitational return of the transfer carriage so that the spring force again returns the mechanism 46 to the vertical position.

In FIG. 5 the fuel element or elements are supported by the carrier 10a which is pivotally mounted on the carriage 50 as in the patent. The carriage 50 has the rollers which run on the linear rails 51 and as shown in the patent; the carrier is pivoted to its erected positions via the guideways with which the carrier is connected, having the upturned curved portions 54 at the upper position and the downwardly curved portions 55 at the lower position, the carrier having the guide rollers 57 and 58 for cooperation at the respective terminal positions. Stops 60 and 61 at the upper and lower positions, respectively, serve to accurately hold the carrier in its vertical positions at the upper and lower locations. In this case, the carrier is an open side carrier so that the fuel elements may be removed sideways as shown at 23'', instead of being loaded and unloaded endwise into and from the carrier, as in the patent. A blind flange 62 closes the lower end of the transfer tube while a gate valve 63 in the form of a sliding plate operated by a cable 63a closes the upper end of the transfer tube.

Still referring to FIG. 5, the fuel element transfer station 38 referred to in connection with FIG. 3, is illustrated. It comprises a water-flooded fuel element transfer container 64 which rides on a carriage 67 so that it can be run into and from the reactor building in the usual manner, the fuel elements being lowered from the pit 14 via a lock 64a.

Figure 6:
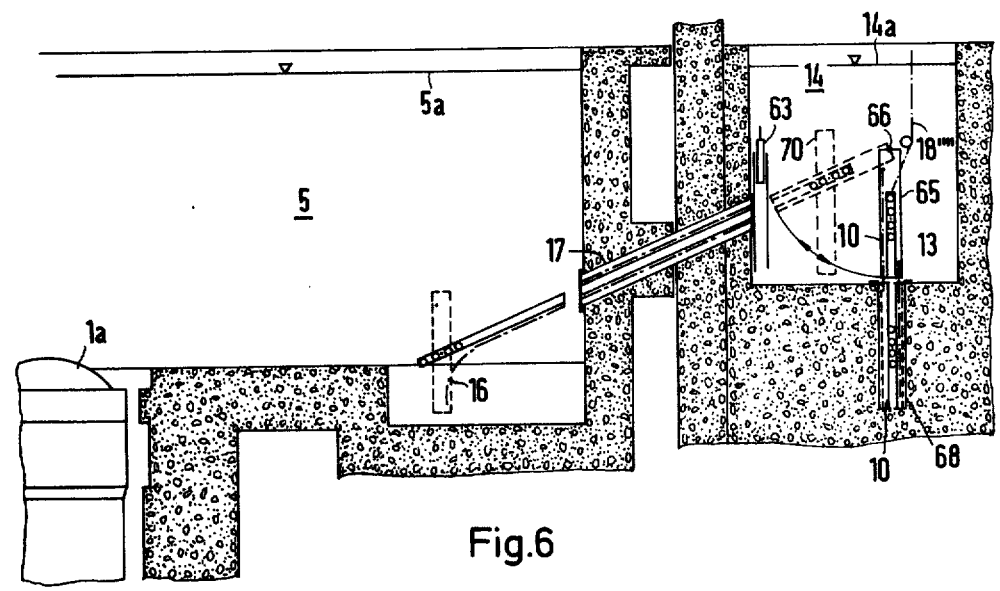
FIG. 6 is like FIG. 5, but shows a modification.

In FIG. 6, the curved guideway arrangement is used at the lower end of the transfer arrangement. In the pit 14 a tilting device 65 is used which generally corresponds to the device 46 in FIG. 4. However, in this instance the pivot point 66 is at the top of the arrangement, the swing being from an alignment with the transfer tube 17 downward to a vertical position, this permitting the entire carriage and carrier to be dropped into a shaft 68 formed in the concrete defining the bottom of the pit 14. This permits a tilting device to be moved aside so that the fuel elements can be removed from the carriage in the shaft and inserted into a storage rack 70 while permitting the pit 14 to be defined with relatively small horizontal dimensions.

What is claimed is:

1. A nuclear reactor installation comprising a containment forming an upstanding wall having opposite sides, a fuel element transfer tube having opposite ends and extending transversely through said wall, said ends respectively opening on said opposite sides of said wall, an elongated fuel element carrier, guide means for guiding said carrier to travel endwise through said tube, said tube being positioned at an angle from horizontal so that one of said ends is a higher end and the other of said ends is a lower end, said angle being sufficient to cause gravity to move said carrier in a downhill direction while guided by said guide means, a flexible cable connected to said carrier, means for applying tension to said cable to pull said carrier uphill while guided by said guide means, said containment forming a fuel element handling pit on the said side of said wall to which said tube's said upper ends opens, said pit being water-flooded, said cable being directed to pull said carrier at said angle of said tube into said pit from said upper end of said tube, and means in said pit for turning said carrier from said angle to a vertical position, said pit having a vertical passage extending downwardly far enough to at least substantially completely receive a fuel element carried by said carrier.

2. The installation of claim 1 in which said passage has a bottom formed by a fuel element lock and said containment forms a fuel element transfer room below said lock so that a fuel element transfer container can be positioned below said lock.

* * * * *